June 9, 1953 — A. I. MIHALAKIS — 2,641,160
VEHICLE INDICATOR OPTICAL PROJECTION DEVICE
Filed Jan. 17, 1949 — 2 Sheets-Sheet 1

INVENTOR.
Agis Ilaki Mihalakis
BY
Bean, Brooks, Buckley & Bean
ATTORNEYS

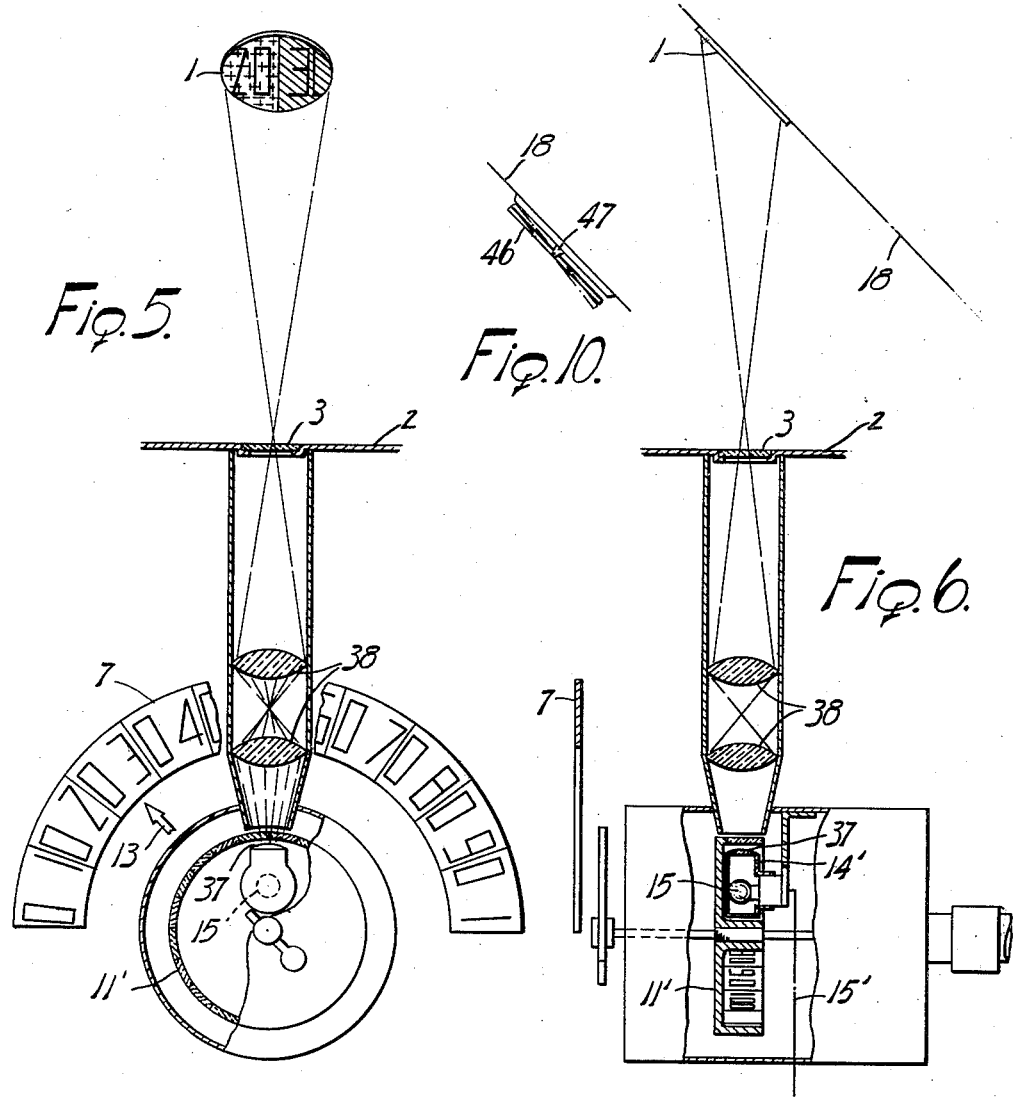

Patented June 9, 1953

2,641,160

UNITED STATES PATENT OFFICE 2,641,160

VEHICLE INDICATOR OPTICAL PROJECTION DEVICE

Agis Ilaki Mihalakis, Battle Creek, Mich., assignor to Glowmeter Corporation, Buffalo, N. Y.

Application January 17, 1949, Serial No. 71,340

17 Claims. (Cl. 88—24)

The invention relates to improvements in automotive speedometers and it has for its aim to facilitate the reading of the registered speed by having it projected adjacent or into the field of vision through the windshield thereby to enable the motorist keeping his gaze forwardly upon the road. The objects of the invention are, first, to bring the actual speedometer reading of the vehicle to a position very near the operator's line of sight, yet not near enough to interfere with his vision of the vehicle's path; second, to make evident to the vehicle-operator, only that portion of the speedometer dial which designates the actual speed of the vehicle, rather than have him search the entire dial for the indicator needle and the subsequent time it takes to cause a registry in his mind of what he observes, during which time, in the current models, his eyes are, of course, off the road; third, to make it possible for the vehicle-operator to know the approximate speed of his vehicle without removing his eyes from the road at all, this especially in night-driving. Although this invention is shown and described as a speedometer, it is obvious that the principle involved could be used with other condition indicating instruments of the vehicle.

One form of the invention is illustrated in the accompanying drawing in which—

Figs. 5 and 6 are views similar to Figs. 1 and 2 but showing a slightly modified arrangement;

Figs. 7, 7a, 8, 8a and 9 are views showing various designs of reflective screens or reflective surfaces which may be used to receive the speed indicating image; and Fig. 10 is a view showing an adjustable screen.

Figure 1:
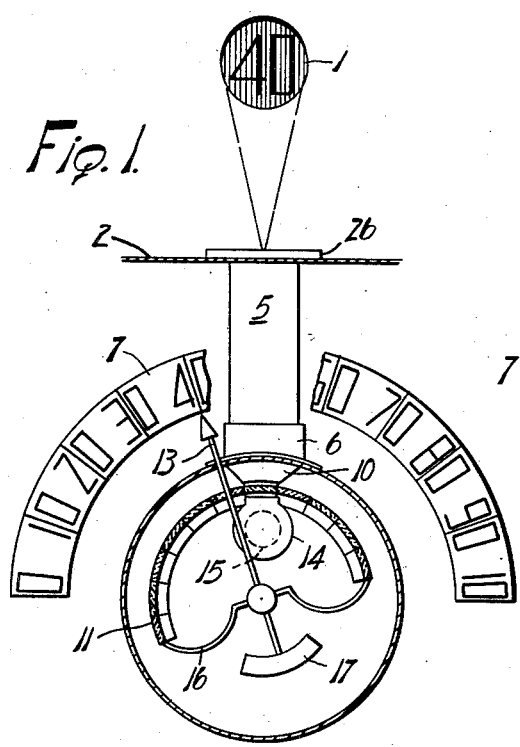
Figure 1 is a direct head-on view of the conventional speedometer with the invention incorporated into its construction.

Fig. 1 of the drawing shows a lightly constructed wheel or drum 11 fixed and suitably balanced by the counterweight 17 to the speedometer pointer shaft 22 by the spokes 16. This wheel 11 is of the lightest possible construction and may be tapered slightly toward the rear of the speedometer, Fig. 2 or otherwise shaped. The periphery or rim of the wheel is formed with a circumferential series of windows, each preferably being of a different and sharply contrasting color and properly designated, with the total number of windows corresponding to the number of ten-mile divisions on the speedometer dial. The circumferential extent or width of each window on wheel 11 is identical throughout and the angular displacement of any two ten-mile designations on the speedometer dial 7 measure the same. The wheel is so adjusted that when the conventional pointer or indicator 13 is pointing to 0 miles per hour, the window adjacent to the right-hand spoke in Figure 1 is at the top, directly beenath the tapered lower end 10 of tube 5. The windows in window-wheel 11 are covered with a transparent substance like colored plastic or Celluloid, the color of each window being of distinct contrast with that of the adjacent windows, such as deep blue, deep red, and rich amber, and preferably running in repetition of this group of three colors. This combination of colors is selected because of their simplicity, distinguishability, and great contrast to each other, but they are purely representative and any combination of colors can be used. Each colored window bears a numeral beginning with 0, and followed by other mileage indications such as 10, 20, 30, etc. running counterclockwise. The function of the window-wheel 11 is to turn on the shaft axis with the indicator pointer 13. Any additional friction which this light-window wheel will cause on the pointer-shaft bearings can be compensated for in the adjustment of the hair-spring tension and proves no obstacle to the efficient performance of the speed indicator.

An electric light bulb 15, such as a small six-volt one but with the greatest possible brilliance, is socketed in a case or shield 14 which is open at the top to register with the lower end 10 of the lens tube. The circuit wires 15' from the lamp 15 lead to a rheostat switch 24, enabling the bulb to be turned on and off independently and its projected light beam varied to any desired intensity.

The tube 5 is supported by a metal band 6 for proper registry with the speed indicating windows as they are successively presented by the wheel, the upper end of the tube emerging from a hole at the top side of dash-cowling 2 and being supported here by rim 26.

A simple lens 12 is supported at its focal length distance from the surface of the windows in wheel 11 by brace rings 8 and 9, while a plain piece of glass 3 is permanently fixed in rim 26 to make the lens holding tube 5 dustproof. In lieu of this lens, a small optical condenser or magnifying glass 37 may be fixed to bulb case 14' for the purpose of intensifying the light from bulb 15. Two additional lenses forming an anastigmatic projection element 38 are fixed in the tube 5. The reflecting surface of disk 1 is the most practical in design. It may be made of a convex surface 39; a concave surface 40; a plain surface of glass, metal, or the like; and either flat or formed with grooves 42; a surface provided with strands of wire or some such substance stretched across it in parallel lines or ribs 44; or raised projections may be formed by cross grooves 45; all as shown in Figs. 7, 7a, 8, 8a, and 9. The screen is preferably fixed on the windshield although it may be made adjustable as in Fig. 10 wherein the screen 46 is pivotally mounted by a bracket 47.

Figure 2:
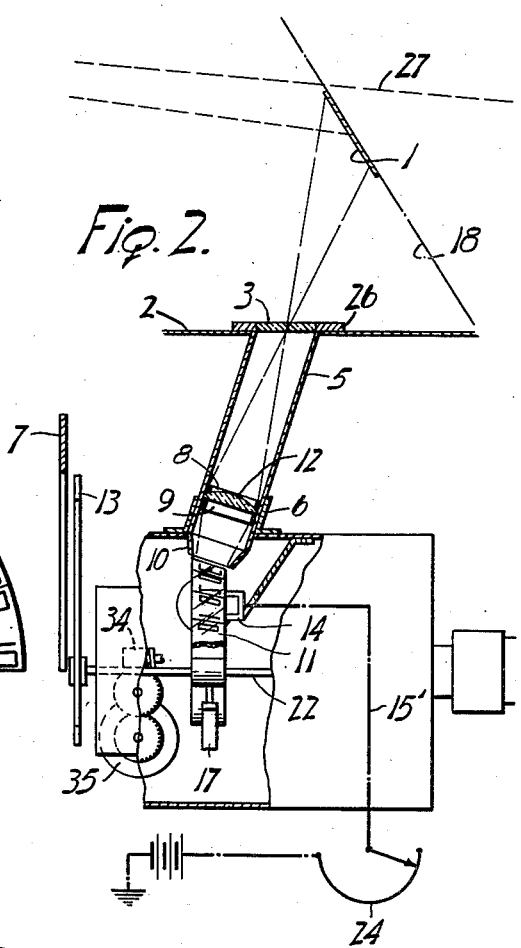
Figure 2 is a view of the same speedometer from the right side, showing one method of construction of the invention where, as in Figure 1, the projection of the speed-numerals goes through a dust-proof tube to the top of the dash cowling.
Figure 4:
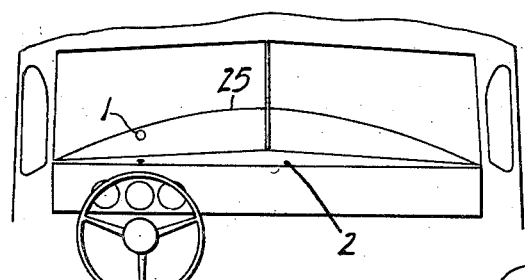
Figure 4 shows the relative position of the reflecting surface of the invention, as it appears to the operator of the vehicle, the reflecting surface being immediately beneath his line of sight to the road and on the edge of the hood line where it will obstruct no view.

In order that adequate space may be obtained between the mileage indicator 35 and the actual mechanism of the conventional speedometer for the installation of the invention, Figure 2, a lengthening of the indicator or pointer shaft 22 and of the worm-gear shaft 34 which turns the mileage indicator is necessary. This has proved successful in working models.

Figure 3:
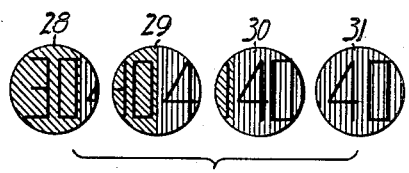
Figure 3 is an illustration of the reflecting surface as it would appear at four successive speeds when the vehicle accelerates from approximately thirty-two to forty miles per hour.

The functioning of the invention is as follows: The light from the bulb 15 (Figure 1) projects the image of the speedometer reading from the colored and numbered windows in wheel 11, through the lens 12 and to the reflecting surface or disk-like screen 1 immediately beneath the operator's line of vision of the roadway. As the vehicle gains momentum, the windows traverse clockwise in a rotating motion, and as the lens inverts and reverses the image, the inverted numbers on the colored window-wheel are rectified and the actual speed in units of ten miles per hour are moved across the screen from right to left. The wheel 11', Figs. 5 and 6, is shown cylindrical. A most important feature of the invention is that the designation of speed is made apparent to the vehicle operator preferably by the changes in color on the reflecting surface. Therefore, it is very easy to drive with the eyes on the road but be fully conscious of which color is glowing on disc 1 and thereby know the approximate speed without the added hazard of looking at the instrument on the dashboard. For example: in Figure 3, there is represented four successive speed indications 28, 29, 30 and 31 in acceleration with the blue shaded areas to the left decreasing and the red shaded areas increasing. If the operator, driving through the suburbs of a city, feels that it is safe to drive at the speed of thirty miles per hour, he need only know that if the color, red, flashes across his screen, his vehicle is accelerating beyond the speed zone limit. The changes in the colors of the disc, regardless of the numerals, are very noticeable. The intensity of the light can be controlled with the rheostat 24 to avoid too bright an image. The speed of a vehicle can be read from the disc 1, to a practical degree of precision, such as a speed of two miles per hour.

In night driving, all dash lights can be extinguished and the simplicity of the invention as well as its usefulness is most manifest.

I am aware that prior to my invention, speedometer dials which changed colors have been made; and while the foregoing description has been given in detail it is without thought of limitation since the present invention is designed to place the speed registering indicia in the field of vision, as indicated by the lines 27, through the windshield and thereby preclude the necessity of the motorist removing his eye from the road to determine his speed of travel. The size of the opaque reflective screen area in the field of vision should therefore be small to avoid obstructing the vision. The size of this reflective area is preferably not over one square inch and may be of circular or other shape. For convenience, it may be referred to as a reflector button. The window 3 will also serve to restrict the projected image to the size of the reflector button.

The projection of the image is accomplished by a lens which projects the image onto a reflective surface and therefore the projected image is brilliant and clearly defined and stands out in vivid contrast to any faint overspread onto the surrounding transparent portion of the windshield. Consequently, the screen area accurately delineates the expanse of the projected image to the size of the button for all practical purposes. The reflective screen button is preferably without an encircling frame and may be elevated above the windshield surface, both factors tending to effect easy concentration of the gaze upon the projected image.

I claim:

1. A motor vehicle having a windshield with an underlying instrument panel structure including a speedometer, said structure having an upper surface provided with a window directed toward the windshield, a screen forming button arranged on the inner surface of the windshield at the lower margin of the field of vision opposite the window and having a small disk-like reflective surface, a transparent member bearing speed indicating indicia and operable by the speedometer in response to speed variations, an objective lens interposed between the indicia bearing member and the button and focused upon the latter for projecting the indicia image directly thereupon, and a source of light concealed within the panel structure and serving to cast its light beam through the indicia member and the lens directly onto the button.

2. A motor vehicle having a windshield with an underlying instrument panel structure including a speedometer, a reflector button arranged on the inner surface of the windshield at the lower margin of the field of vision and being of a size sufficiently small to offer practically no obstruction to the vision through the windshield, a transparent member bearing speed-indicating indicia and operable by the speedometer in response to speed variation, a projecting lens interposed between the indicia bearing member and the button and focused upon the latter for projecting the indicia image directly thereupon, a dust proof housing inclosing the projecting lens, and a source of light concealed within the panel structure and serving to cast its light beam through the indicia member and the lens directly onto the button.

3. In a vehicle having a transparent viewing window and an instrument panel structure positioned adjacent said window, an indicating device carried by said panel structure and operatively connected to a functioning element of the vehicle, opaque screen means of small area positioned closely adjacent said window and closely adjacent the line of sight through said window, said indicating device having a rotatable light-transmitting indicia-bearing member, objective lens means interposed between said indicia-bearing member and said screen means and focusing the indicia upon said screen means, and a light source concealed behind said panel structure in operative alignment with said indicia-bearing member and said objective lens means, whereby an image of the indicia is projected upon said screen means.

4. In a vehicle having a windshield and an instrument panel structure positioned adjacent said windshield, an indicating device carried by said panel structure and operatively connected to a functioning element of the vehicle, opaque screen means adjacent said windshield in the vehicle operator's line of sight through said windshield to the forward portion of said vehicle, said indicating device having a rotatable light-transmitting indicia-bearing member, objective lens means interposed between said indicia-bearing member and said screen means and focusing the indicia upon said screen means, and a light source concealed within said panel structure in operative alignment with said indicia-bearing member and said objective lens means, whereby an image of the indicia is projected upon said screen means.

5. In a vehicle having a windshield and an instrument panel structure positioned adjacent said windshield, an indicating device carried by said panel structure and operatively connected to a functioning element of the vehicle, opaque screen means of relatively small area carried by said windshield, said screen means being closely adjacent to said windshield and to the line of sight through said windshield, said indicating device having a rotatable light-transmitting indicia-bearing member, objective lens means interposed between said indicia-bearing member and said screen means and focusing the indicia upon said screen means, and a light source concealed behind said panel structure in operative alignment with said indicia-bearing member and said objective lens means, whereby an image of the indicia is projected upon said screen means.

6. In a vehicle having a windshield and an instrument panel structure adjacent said windshield, an indicating device carried within said panel structure and operatively connected to a functioning element of the vehicle, opaque screen means of relatively small area positioned closely adjacent said windshield and closely adjacent the line of sight through said windshield, said panel structure having a surface provided with a window directed toward said screen means, said indicating device having a rotatable light-transmitting indicia-bearing member, objective lens means interposed between said indicia-bearing member and said screen means and focusing the indicia upon said screen means, and a light source concealed behind said panel structure in operative alignment with said indicia-bearing member and said objective lens means and said window, whereby an image of the indicia is projected upon said screen means.

7. An apparatus as set forth in claim 6, wherein said window is provided with a transparent covering.

8. In a vehicle having a transparent viewing window and an instrument panel structure positioned adjacent said window, an indicating device carried by said panel structure and operatively connected to a functioning element of the vehicle, opaque screen means of relatively small area positioned closely adjacent said window and closely adjacent the line of vision through said window, said indicating device having a rotatable light-transmitting indicia-bearing member, objective lens means interposed between said indicia-bearing member and said screen means and focusing the indicia of said member upon said screen means, a dust-proof housing enclosing said objective lens means, and a light source concealed within said panel structure in operative alignment with said indicia-bearing member and said objective lens means, whereby an image of the indicia is projected upon said screen means.

9. In a vehicle having a windshield and an instrument panel structure adjacent said windshield, an indicating device carried within said panel structure and operatively connected to a functioning element of the vehicle, opaque screen means of relatively small area positioned closely adjacent said windshield and closely adjacent the line of sight through said windshield, said panel structure having a surface provided with a window directed toward said screen means, said window being provided with a transparent covering, said indicating device having a movable light-transmitting indicia-bearing member, objective lens means interposed between said indicia-bearing member and said screen means and focusing the indicia upon said screen means, a dust-proof housing enclosing said objective lens means and extending from said window to a point adjacent said indicia-bearing member, and a light source concealed within said panel structure in operative alignment with said indicia-bearing member and said objective lens means, whereby an image of the indicia of said member is projected onto said screen means.

10. In a vehicle having a windshield and an instrument panel structure adjacent said windshield, an indicating device carried by said panel structure and operatively connected to a functioning element of the vehicle, opaque screen means of small area positioned adjacent said windshield and adjacent the vehicle operator's line of sight through said windshield, said indicating device having a light-transmitting indicia-bearing member movable back and forth in a predetermined path operable thereby, objective lens means interposed between said indicia-bearing member and said screen means and focusing the indicia upon said screen means, and a light source concealed behind said panel structure in operative alignment with said indicia-bearing member and said objective lens means, whereby an image of the indicia is projected upon said screen means.

11. In a vehicle having a viewing window and an instrument panel structure positioned adjacent said window, an indicating device carried by said panel structure and operatively connected to a functioning element of the vehicle, opaque screen means of relatively small area positioned adjacent the line of vision through said window so as to be easily viewed by the vehicle operator, said indicating device including a light-transmitting indicia-bearing member arranged for reciprocating movement operable thereby, objective lens means interposed between said indicia-bearing member and said screen means and focusing the indicia upon said screen means, and a light source concealed behind said panel structure in operative alignment with said indicia-bearing member and said objective lens means, whereby an image of the indicia is projected upon said screen means.

12. An apparatus as set forth according to claim 11, wherein said opaque screen means is adjustably mounted closely adjacent said window and the line of sight through said window.

13. An apparatus as set forth according to claim 11, wherein said indicia-bearing member is provided with differently colored light-transmitting portions, whereby the projected indicia image is colored and will vary in color.

14. An apparatus as set forth according to claim 11 wherein said indicia-bearing member is transparent.

15. An apparatus as set forth according to claim 11, wherein said indicating device is a speedometer and the indicia are speed indicating indicia.

16. An apparatus as set forth according to claim 11, wherein said indicia-bearing member is colored with a combination of colors each extending over a particular indicia range, with said combination of colors repeating itself throughout the entire indicia range.

17. An apparatus as set forth according to claim 11, wherein condensing means are positioned in operative alignment with said light source and said indicia-bearing member for condensing light rays from said light source through said indicia-bearing member.

AGIS ILAKI MIHALAKIS.

References Cited in the file of this patent

UNITED STATES PATENTS

| Number | Name | Date |
|---|---|---|
| 1,144,009 | Swanson | June 22, 1915 |
| 1,151,502 | Troeger | Aug. 24, 1915 |
| 1,684,682 | Prettyman | Sept. 18, 1928 |
| 1,747,355 | Elworthy | Feb. 18, 1930 |
| 1,757,493 | Wharan | May 6, 1930 |
| 1,939,161 | Bestelmeyer | Dec. 12, 1933 |
| 2,086,556 | Jacobson | July 13, 1937 |
| 2,131,039 | Draeger | Sept. 27, 1938 |
| 2,160,202 | Fieux | May 30, 1939 |
| 2,191,045 | Slayton | Feb. 20, 1940 |
| 2,264,044 | Lee | Nov. 25, 1941 |
| 2,370,263 | Sahweizer | Feb. 27, 1945 |
| 2,380,241 | Jelley et al. | July 10, 1945 |